(12) United States Patent
Dati et al.

(10) Patent No.: US 6,934,102 B2
(45) Date of Patent: Aug. 23, 2005

(54) ENCODING AND DECODING PROCESS AND CORRESPONDING DATA DETECTOR

(75) Inventors: Angelo Dati, Abbiategrasso (IT); Davide Giovenzana, Monza (IT)

(73) Assignee: STMicroeletronics S.r.l., Agrate Brianza (IT)

( * ) Notice: Subject to any disclaimer, the term of this patent is extended or adjusted under 35 U.S.C. 154(b) by 564 days.

(21) Appl. No.: 10/033,726

(22) Filed: Dec. 28, 2001

(65) Prior Publication Data

US 2003/0128449 A1 Jul. 10, 2003

(51) Int. Cl.[7] .............................. G11B 5/09; H03M 7/20; H04L 27/10
(52) U.S. Cl. .......................... 360/39; 360/48; 375/282; 341/102
(58) Field of Search ........................... 341/102, 59, 70, 341/71, 58, 98; 375/282, 283, 264, 333, 341, 361, 363; 360/39, 40, 48; 714/758, 759, 791, 792, 794, 795, 800

(56) References Cited

U.S. PATENT DOCUMENTS

| | | | | |
|---|---|---|---|---|
| 5,661,760 A | * | 8/1997 | Patapoutian et al. | 360/48 |
| 5,777,566 A | * | 7/1998 | Shimoda | 341/58 |
| 5,920,440 A | | 7/1999 | Bang | 360/51 |
| 6,052,244 A | | 4/2000 | Haraguchi et al. | 360/46 |
| 6,606,728 B1 | * | 8/2003 | Aziz | 360/48 |

FOREIGN PATENT DOCUMENTS

JP        09238306    *   9/1997

OTHER PUBLICATIONS

"Analysis of a Biphase–Based Servo FOrmat for Hard Disk Drives", by Makinwa et al. IEEE Transactions on Magnetics, vol. 36, No. 6, Nov., 2000, pp. 4019–4027.*
IEEE Document Titled: "A Joint Source/Channel Coder Design" by Liu et al., 1991, pp. 1190–1194.*
IEEE Document Titled: "Turbo Codes for PR4 and EPR4 Magnetic Recording" by McPheters et al., 1998, pp. 1778–1782.*
IEEE Document Titled: "Codes for Improved Timing Recovery in PR4 and EPR4 Magnetic Recording" by McLaughlin et al., 1997, pp. 1235–1239.*

* cited by examiner

*Primary Examiner*—David Hudspeth
*Assistant Examiner*—Glenda P. Rodriguez
(74) *Attorney, Agent, or Firm*—Lisa K. Jorgenson; Robert Iannucci; SEED IP Law Group PLLC

(57) ABSTRACT

A system provides two distinct solutions for encoding and decoding servo positioning data for a hard disk drive. A first solution includes: encoding each group of four bits of a pattern signal in a Matched Spectral Null (MSN) format through an intermediate rate 4/6 code; providing a duplicated bit for each bit of the six bit code word obtained with the previous step. A second solution includes: encoding each group of four bit of the pattern signal adding a parity check bit as an intermediate rate 4/5 code; encoding each of the five bits using the biphase map. Both solutions include subsequently: reading a servo wedge information signal using a read and write channel of the hard disk drive; and using a trellis Partial Response decoding scheme matched to the encoded word for obtaining angular and radial information for the head positioning.

28 Claims, 11 Drawing Sheets

| UNCODED 4 BIT WORD | CODED PATTERN |
|---|---|
| 0000 | 001100110000 |
| 0001 | 001100110011 |
| 0010 | 001100000110 |
| 0011 | 001100000011 |
| 0100 | 000110001100 |
| 0101 | 000110011000 |
| 0110 | 001100001100 |
| 0111 | 001100011000 |
| 1000 | 000000110000 |
| 1001 | 000000110011 |
| 1010 | 000001100110 |
| 1011 | 000001100011 |
| 1100 | 000110000110 |
| 1101 | 000110000011 |
| 1110 | 000011000110 |
| 1111 | 000011000011 |

ENCODER

```
switch( gray_in ) { case 4'b0000: msn = 6'b001011:
case 4'b0001: msn = 6'b001110:
case 4'b0011: msn = 6'b011010:
case 4'b0010: msn = 6'b010011:
case 4'b0110: msn = 6'b010110:
case 4'b0111: msn = 6'b011100:
case 4'b0101: msn = 6'b001101:
case 4'b0100: msn = 6'b011001:
case 4'b1100: msn = 6'b110001:
case 4'b1101: msn = 6'b010101:
case 4'b1111: msn = 6'b110100:
case 4'b1110: msn = 6'b100101:
case 4'b1010: msn = 6'b101100:
case 4'b1011: msn = 6'b100110:
case 4'b1001: msn = 6'b100011:
case 4'b1000: msn = 6'b101001:
} assign
cw_out={2'b{msn{5}},2'b{msn{4}},
2'b{msn{2}},2'b{msn{1}},2'b{0}}}:
```

FIG.11

DECODER

```
assign cw_in={ msn{10}, msn{8},
msn{6}, msn{4}, msn{2}, msn{0}}:

switch( msn ) { case 6'b001011: gray_out = 4'b0000:
case 6'b001110: gray_out = 4'b0001:
case 6'b011010: gray_out = 4'b0011:
case 6'b010011: gray_out = 4'b0010:
case 6'b010110: gray_out = 4'b0110:
case 6'b011100: gray_out = 4'b0111:
case 6'b001101: gray_out = 4'b0101:
case 6'b011001: gray_out = 4'b0100:
case 6'b110001: gray_out = 4'b1100:
case 6'b010101: gray_out = 4'b1101:
case 6'b110100: gray_out = 4'b1111:
case 6'b100101: gray_out = 4'b1110:
case 6'b101100: gray_out = 4'b1010:
case 6'b100110: gray_out = 4'b1011:
case 6'b100011: gray_out = 4'b1001:
case 6'b101001: gray_out = 4'b1000:
default : gray_out = 4'b0000:
}
```

FIG.12

ENCODING AND DECODING PROCESS AND CORRESPONDING DATA DETECTOR

BACKGROUND OF THE INVENTION

1. Field of the Invention

The present invention relates to an encoding and decoding process for a servo positioning system in Hard Disk Drive (HDD).

The invention also relates to an encoder and decoder detector for implementing the above process.

2. Description of the Related Art

As is well known in this specific technical field, in data reading and writing hard disk systems the positioning phase of the reading-writing head is performed with the aid of positioning information that are available on the magnetic support, that is on a magnetic disk sector.

This kind of information, generally called 'servo', are written radially on the magnetic disk and, because of their peculiar shape, are denoted 'servo wedges'.

A possible distribution of the 'servo wedges' is shown schematically in the enclosed FIG. 1, not in scale proportion, and in comparison with the other sectors wherein the data are commonly stored in the HDD system.

During the disk rotation the servo fields are periodically read to check both the radial and the angular position of the reading-writing head.

The positioning check and the corresponding scanning algorithm are mainly managed by a controller of the HDD system using a specific software. In this respect, a read and write (RW) channel is provided wherein some devices are implemented for picking-up the angular and radial information for the head positioning.

These angular and radial information are transferred to the control algorithm of the HDD system controller.

Let's briefly see what is the pattern of the 'servo wedges' that includes a plurality of fields.

A possible pattern signal is shown in FIG. 2 wherein an initial signal portion is identified as preamble and synchronization field, hereinafter sync field. This initial signal portion is used to assure the synchronization of the sampling system and the correct identification of that portion of the various pattern fields by the RW channel.

The identification of the sync field immediately provides the reference angular signal for the head positioning, computed starting from a synchronous index signal for generating the motor phases controlling the disk rotation.

A subsequent portion of the pattern signal of the 'servo wedges', that will be called "gray code", reports an indent of the disk track. A gray code detector is disclosed for instance in the U.S. Pat. No. 5,920,440.

This invention mainly relates to the servo gray code detection phase.

A final portion of the pattern signal of the 'servo wedges' is called 'burst' field and allows to define the fine radial positioning of the reading-writing head.

The shape of the burst field is similar to the preamble field but with a wider and controlled amplitude.

The HDD controller is able to determine with high precision the positioning correction of the head by measuring the amplitude of the various burst fields in relationship with the knowledge of the track index.

The RW channel of the HDD system shares a portion of the electronic circuitry used for the data reading and for reading the pattern of the servo wedges.

However, generally the servo fields are not written by the RW channel but fixed in tracks before the HD assembly by suitable writing machines allowing a writing precision higher that that normally available by the RW channel.

Even if different writing techniques are available, the spectral content of the servo wedges is always at the lower frequency if compared to the data frequency, with the servo preamble field tone equal roughly to one half that of the data preamble field.

A larger space given to the servo wedge bit allows of course a better reading.

By sampling at the data frequency it's possible to obtain multiple representations of the written servo wedge bit. This is convenient under the point of view of the RW channel implementation to have a reduced spread between the data working frequency and the servo wedge working frequency.

Keeping in mind the systematic doubling of each information bit, by equalizing the signal a reliable detector may be obtained. Moreover, the input noise is concentrated at low frequencies; so, by sampling twice the same information bit a double signal is obtained but not a double noise.

The RW servo channel equalization is a subcase of the Partial Response scheme normally used in the data sector. FIG. 3 shows a schematic example of the response of the reading system, including the pre-amplifier and the reading head, to an isolated transition. Always in FIG. 3 it is shown the shape of that response after an equalization step to the partial response target '$1-D^2$'—with D as the unit delay operator—denoted PR4 and disclosed for instance in the U.S. Pat. No. 6,052,244.

The PR4 partial response equalization scheme seems to be the most suitable for the working channel density during the servo phase, as reported in FIGS. 4 and 5. If we suppose as a basic limit that the minimum distance between two subsequent transactions must be $2T_{channel}$ it's easy to demonstrate that it's impossible to code with rates higher than ½. The simple repetition code reaches the capacity of the limit.

A first prior art solution to provide a better servo gray code detection for the servo positioning system in HDD is provided by a CMOS RW channel chip for HDD systems manufactured by STMicroelectronics and commercially known as "Bramante". This channel chip supports data rates up to 750 Mbit/s and features advanced signal processing that allows the same channel to be used on a wide range of drives and also with wide tolerance heads and media.

In addition to the data recovery architecture, the channel chip also features a fully synchronous servo detection scheme. A proprietary 4/12 coding scheme for servo gray code paired with a matched Trellis detector can be used to allow better disk formatting compared to other ¼ biphase gray code rates.

The 4/12 coding scheme used by this CMOS RW channel chip is schematically shown in FIG. 6.

As reported in FIG. 7, a trellis PR4 decoding scheme is shown. Some transactions are reported by dotted lines and must be allowed during the preamble phase and on the sync mark.

The 4/12 coding scheme requires a coding and decoding table that is shown in FIG. 8.

According to the teachings of the prior art, other kind of code rates are available on the above RW channel chip. For instance, the well known ¼ gray code rates are automatically supported by the channel chip to overcome any servo formatting legacy issue. A fully embedded modified Discrete Fourier Transform (DFT) burst demodulation scheme provides significant gain in determining head position also reducing the latency of the servo loop.

While the Bramante solution for servo wedges has been developed to exploit the Maximum Likelihood (ML) detection advantage for servo gray field—traditionally detected on a symbol-by-symbol basis—the 4/12 gray scheme does not achieve a significant coding gain. Moreover, the equalization PR target had to compromise with the data detection scheme for implementation complexity issues.

BRIEF SUMMARY OF THE INVENTION

An embodiment of the present invention provides an encoding and decoding process for a servo positioning system in a Hard Disk Drive allowing better performances in the gray coding phase.

Another embodiment of the present invention provides a servo gray code Viterbi detector improving the coding gain.

A further embodiment of the present invention provides an encoding process performed in a reduced number of steps.

An embodiment of the invention here disclosed provides a system including two distinct solutions for encoding and decoding servo positioning data for an Hard Disk Drive system. Any implementation of the described system may embody both the optional solutions with a minimal reconfiguration of the detector core. Both solutions, while retaining all the servo formatting advantages of the prior art, provide additional coding gain.

One solution includes the following steps:
  encoding each group of four bit of the pattern signal in a Matched Spectral Null (MSN) format through an intermediate rate 4/6 code;
  providing a duplicated bit for each bit of the six bit code word obtained with the previous step.

The second solution includes the following steps:
  encoding each group of four bit of the pattern signal adding a parity check bit as an intermediate rate 4/5 code;
  encoding each of the five bits using the biphase map.

For both solutions then the following subsequent steps are employed:
  reading a servo wedge information signal using a read and write channel of the Hard Disk Drive system;
  using a trellis Partial Response decoding scheme matched to said encoded word for obtaining the angular and radial information for the head positioning.

The invention further relates to a data detector for the encoding and decoding phases in a servo positioning system of a Hard Disk Drive reading and writing head, said detector being associated to a reading and writing channel for picking-up servo wedges information from the HDD magnetic support and to a decoder including a trellis structure for obtaining a partial response indicative of the angular and radial information for the head positioning, wherein said dector is a Viterbi detector receiving from said channel servo wedges information encoded through an intermediate 4/6 Matched Spectral Null (MSN) encoding phase followed by a duplication of each bit of the six bit code word obtained with the 4/6 encoding phase.

For the second solution it is selected as code option, the above-mentioned Viterbi detector will observe servo wedge information processed by an encoder which can be described as the concatenation of a 4/5 parity check encoder and biphase encoder.

The features and advantages of the data detector and the encoding and decoding process according to the invention will be apparent from the following detailed description of embodiments thereof, given as non-limiting examples with reference to the accompanying drawings.

BRIEF DESCRIPTION OF THE DRAWINGS

FIGS. 11 and 12 report in a table format a pseudo-verilog code to describe encoding and decoding processes according to the present invention;

DETAILED DESCRIPTION

Figure 1:
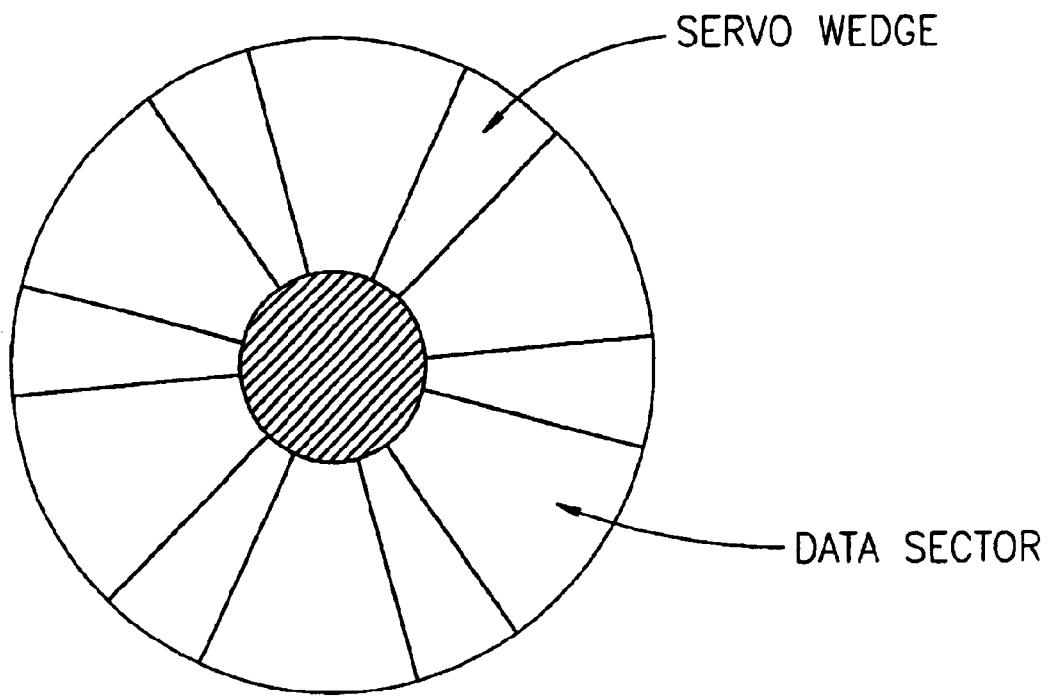
FIG. 1 is a non-scale schematic view of a possible data and servo wedges information distribution on a disk of a HDD system.
Figure 2:
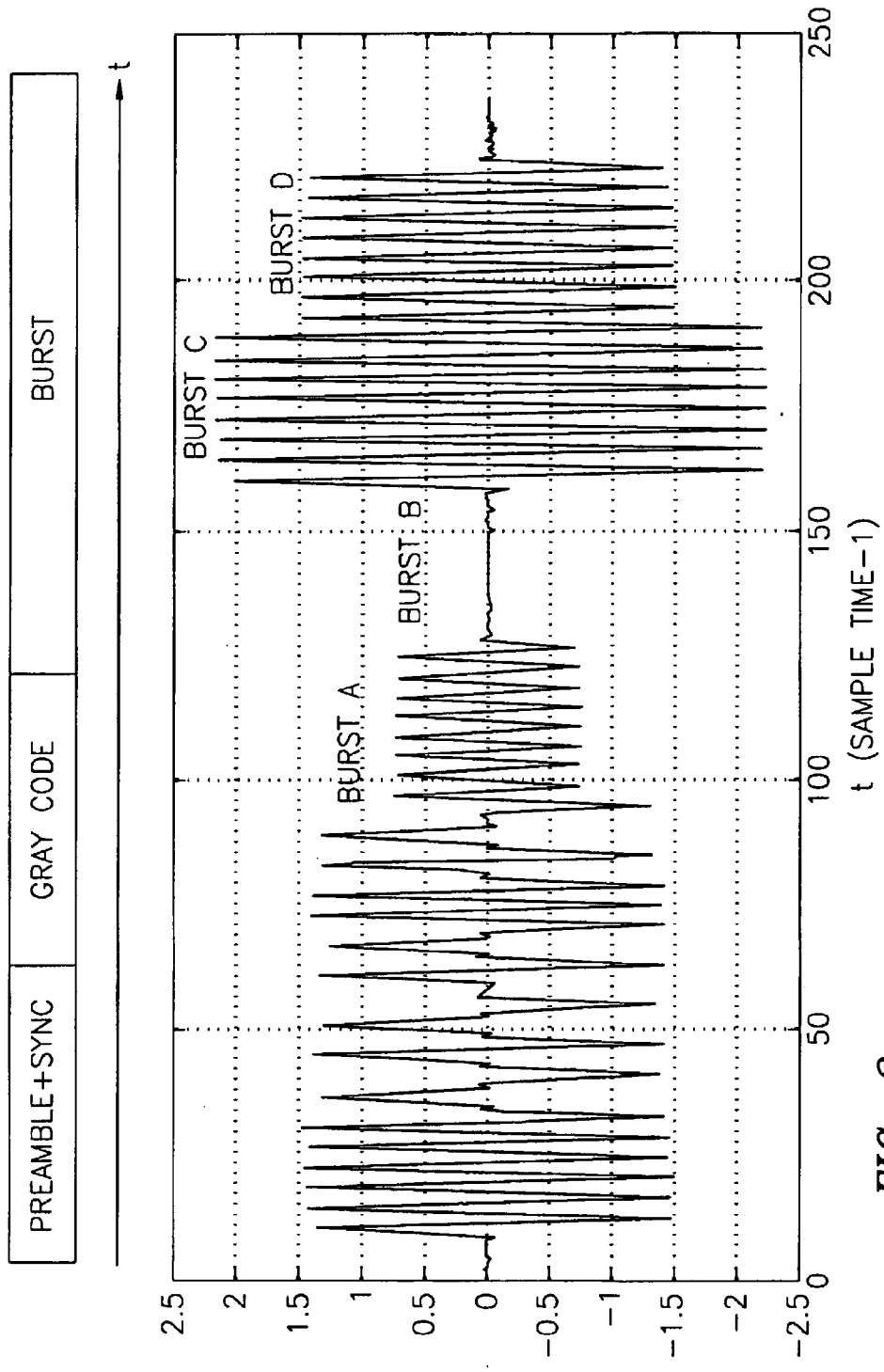
FIG. 2 is a schematic view of a servo wedge pattern sample formed by adjacent fields, so-called pattern fields, that are available on a servo wedge portion of a HDD system.
Figure 3:
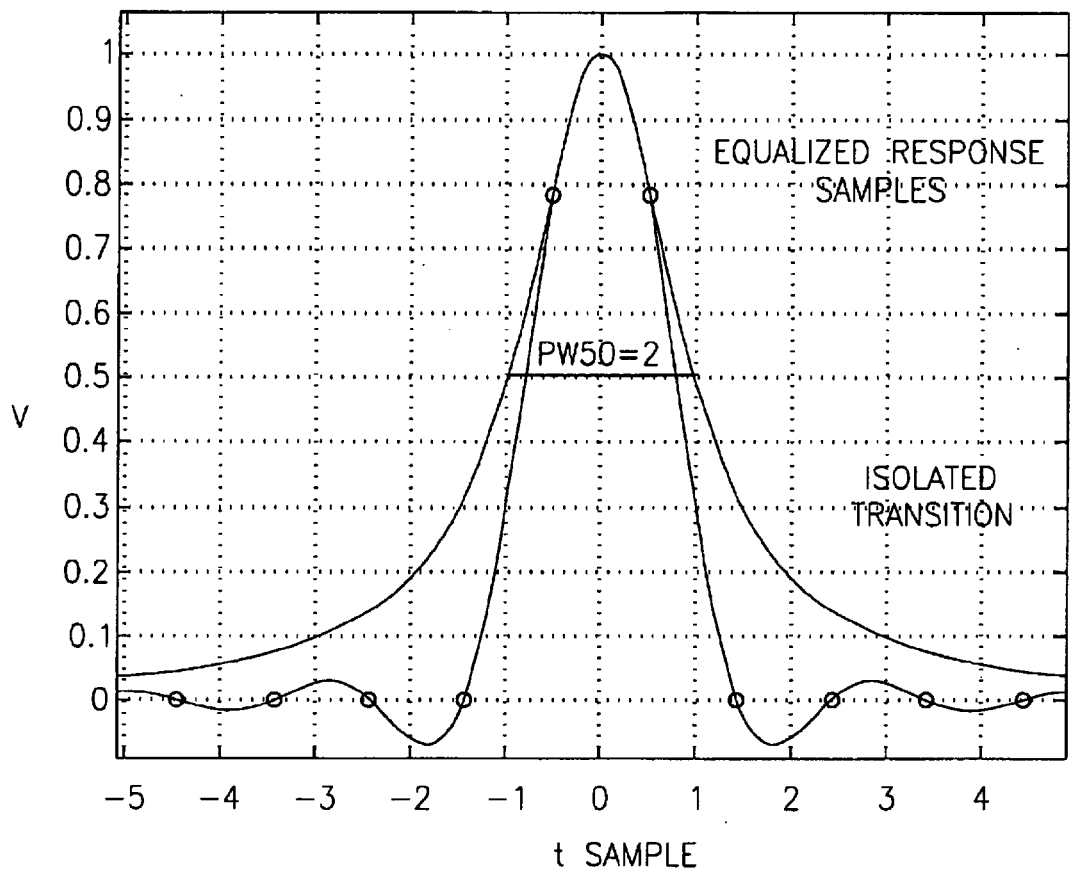
FIG. 3 shows a voltage vs. time diagram of the reading system response (pre-amplifier+head) to a single transaction, as well as a partial response after equalization denoted PR4.
Figure 4:
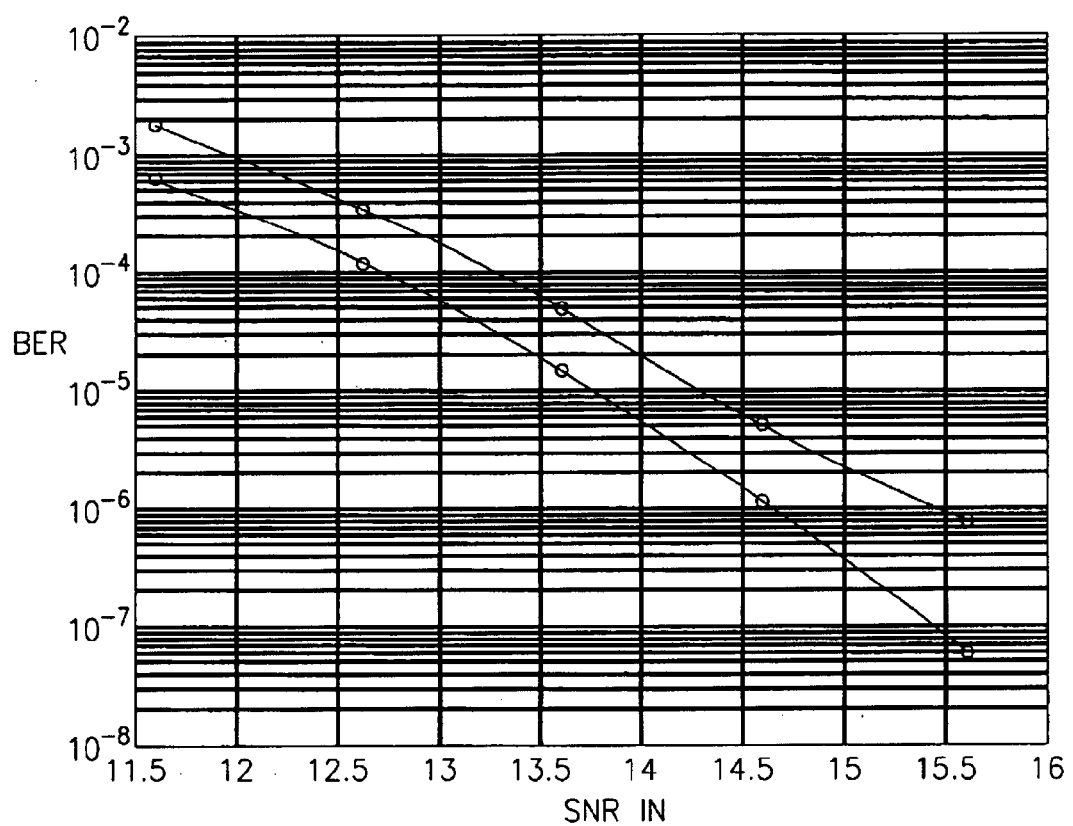
FIG. 4 shows a BER vs. a Signal-Noise Ratio (SNR) diagram including the bit error rate curves for a partial response PR4 and for a partial response EPR4.
Figure 5:
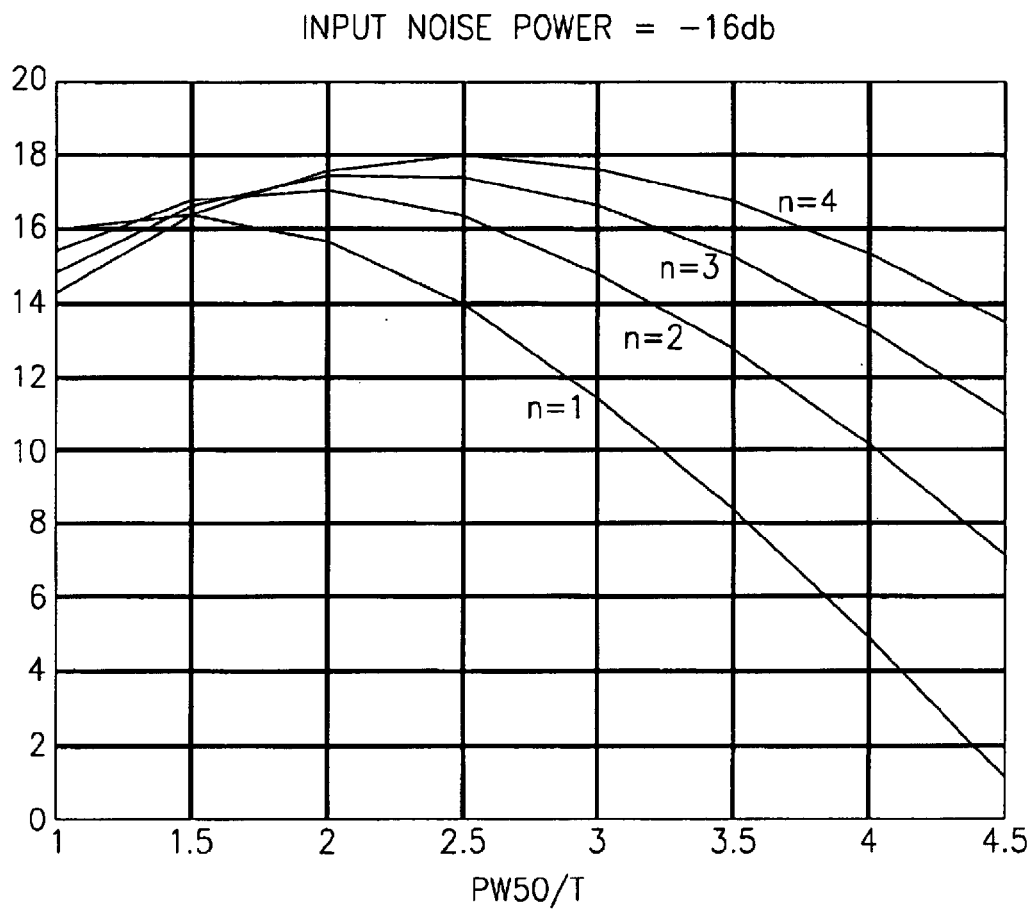
FIG. 5 shows an SNR vs. PW50/T diagram including the uncoded transmission and input white noise curves as a function of the channel density and of the Partial Response class $(1-D)*(1+D)^n$, with n integer.

According to the drawing Figures, and more particularly to the examples of the Figures from 6A to 16, it is now disclosed an encoding and decoding process according to the present invention for a servo positioning system of a Hard Disk Drive reading and writing head.

Figure 6A:
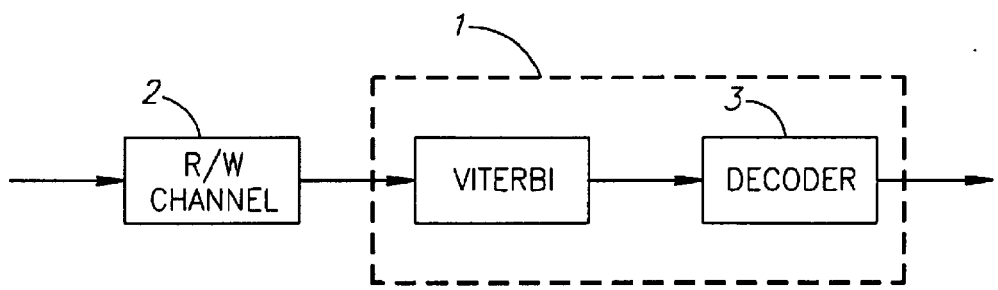
FIG. 6A shows a schematic view of a Viterbi detector for implementing a process according to the present invention.
Figure 6:
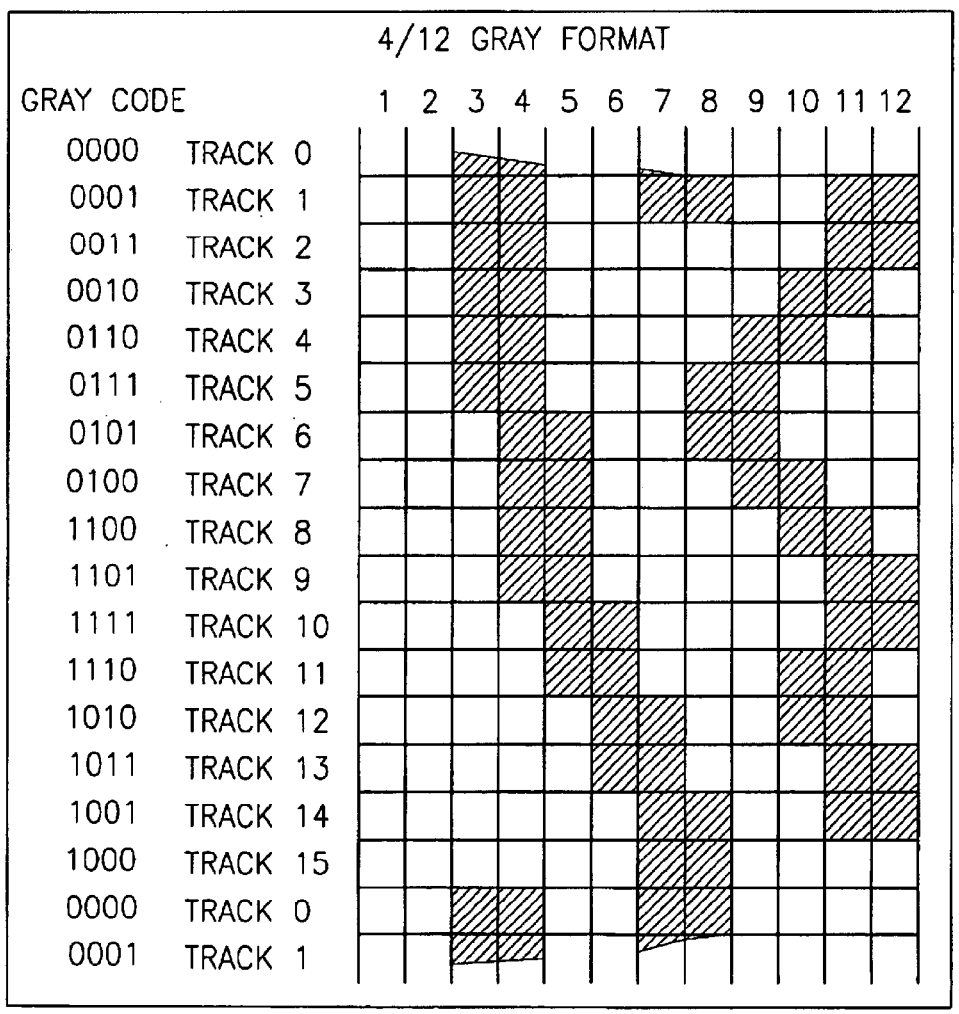
FIG. 6 shows a schematic view of a 4/12 code scheme implemented on a prior art RW Channel chip.
Figures 7, 8:
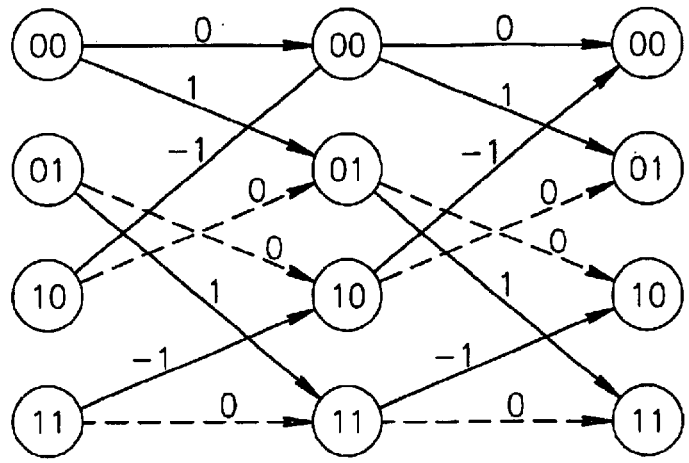
FIG. 7 is a block scheme of a trellis PR4 state machine for the encoding phases of the 4/12 code shown in FIG. 6.
FIG. 8 is a table picture of the encoding and decoding scheme for the 4/12 code of FIG. 6.

This process is implemented through a data detector 1 shown in FIG. 6A as associated to a RW channel 2 for HDD systems. The detector 1 is a Viterbi detector downstream connected to said RW channel 2 and having an output connected to a decoder block 3 providing the angular and radial information for the head positioning.

For the following considerations we will assume that the servo wedge pattern signal provided to the detector 1 by the RW channel 2 includes a gray code comprising a multiple of four bit. Each group of four bit will be identified as a gray nibble.

We assume PR4 as the target equalization scheme for the servo pattern density range. If we assume as basic encoding constraint that the minimum transition spacing has to be $2T_{channel}$, where $T_{channel}$ is the channel synchronization time unit, it is easy to show that it is not possible to encode at rates higher than ½. However, the simple repetition code achieves capacity.

According to an embodiment of the invention, two servo gray coding and detection schemes are proposed to be selected according to performance and user requirements. Setting the repetition code as a reference, the following table 1 compares the proposed selection, including the current gray scheme for the Channel chip of the prior art.

TABLE 1

| Type | Rate | De-tector states | Distance gain over Rate 1/2 | Projected rate loss (*) | Projected overall gain |
|---|---|---|---|---|---|
| Repetition | 1/2 | 2 | 0 db | 0 db | Reference |
| RW Know Channel Chip | 4/12 | 4 | 0 db | 0.8 db | −0.8 db |
| MSN | 4/12 | 4 | 3 db | 0.8 db | 2.2 db |
| Biphase | 1/4 | 2 | 4.77 db | 1.8 db | 2.97 db |
| Biphase PC | 4/20 | 4 | 7.78 db | 2.8 db | 5 db |

This table is a servo gray code robustness comparison. The data indicated with (*) is a conservative estimate, based on the assumption of the encoded gray section covering around 30% of the total servo pattern length.

According to an embodiment of the present invention, the encoding process is performed using a 4/12 Matched Spectral Null (MSN) code; that is to say: a first encoding step is performed on each group of four bit (gray nibble) of the pattern signal in a Matched Spectral Null (MSN) format through an intermediate mapping phase producing a rate 4/6 code.

In other words, the detector uses a servo gray code supporting a 4/12 rate MSN code. Such a code ensures a +3 db coding gain with respect to the 4/12 code of the prior art with a d=2, k=8 RLL [d=minimum Euclidean distance between two transitions; k=maximum absence of transitions] constraint and requires a four states Viterbi detector matched to both code and PR4 channel constraints.

The encoding process is performed in two steps:

first step: each gray nibble is encoded in a MSN format through a rate 4/6 code;

second step: each bit of the 6 bit code word is duplicated to ensure a minimum write feature of $2T_{channel}$. A duplicated bit is provided for each bit of the six bit code word obtained with the previous step.

The encoding process is thus a concatenation of a 4/6 MSN and a ½ repetition code, yielding an overall ⅓ rate.

If we define a Running Digital Sum (RDS) for the six-bits sequence cw={$x_0, x_1, x_2, \ldots, x_5$} obtained with the first step as:

$$RDS[cw] = \sum_{i=0}^{5} (-1)^{x[i]}$$

where x[i] may be 0 or 1, the six-bits sequence is in the 4/6 MSN code if RDS [cw]=0.

Figure 9:
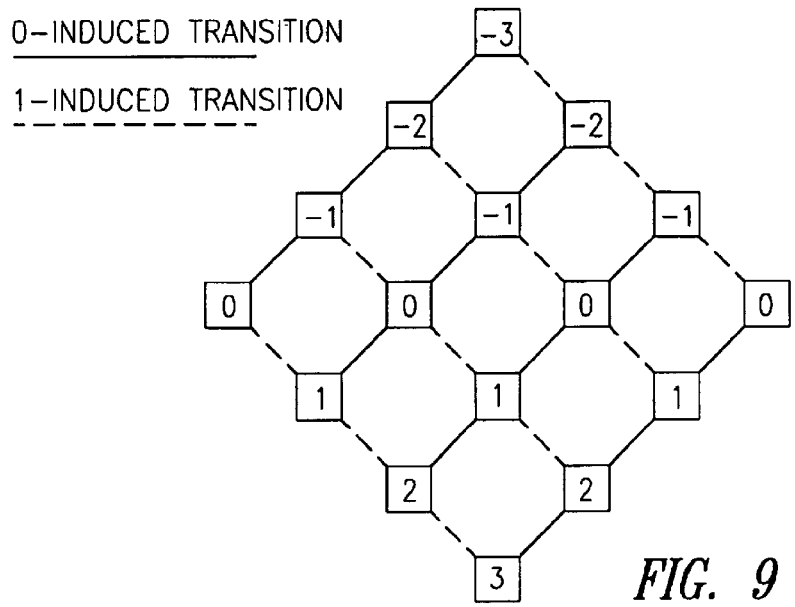
FIG. 9 shows a basic trellis structure of a MSN 4/6 code used for an encoding process according to the present invention.

FIG. 9 shows a basic trellis structure of a MSN 4/6 code. The starting state indicated with IN is also the end state. This trellis structure supports twenty sequences with zero RDS thus enabling the design of the rate 4/6 code.

According to an embodiment of the present invention, the first step code word selection or mapping process will prevent MSN sequences such as '000111' and '111000' in order to minimize the number of trellis states. Other two MSN words are discarded taking into account the 'gray-like' requirement of the servo gray codebook. Thus the whole state machine of the Viterbi detector includes only sixteen states instead than twenty.

This 'gray-like' property has the aim to ensure that—when flying across two track boundaries—adjacent servo id fields add coherently in the largest number of bit locations in order to strengthen the id-detection. This encoding rule allows a built-in uncertainty in the off-track conditions just between track identifiers of the two adjacent tracks the head is flying over.

The implicit requirement of a minimum phase skew between adjacent tracks should be observed like any other servo scheme.

The 'gray-like' feature is achieved imposing on the codebook the property of minimum distance between code words corresponding to two consecutive gray codes.

Figure 10:
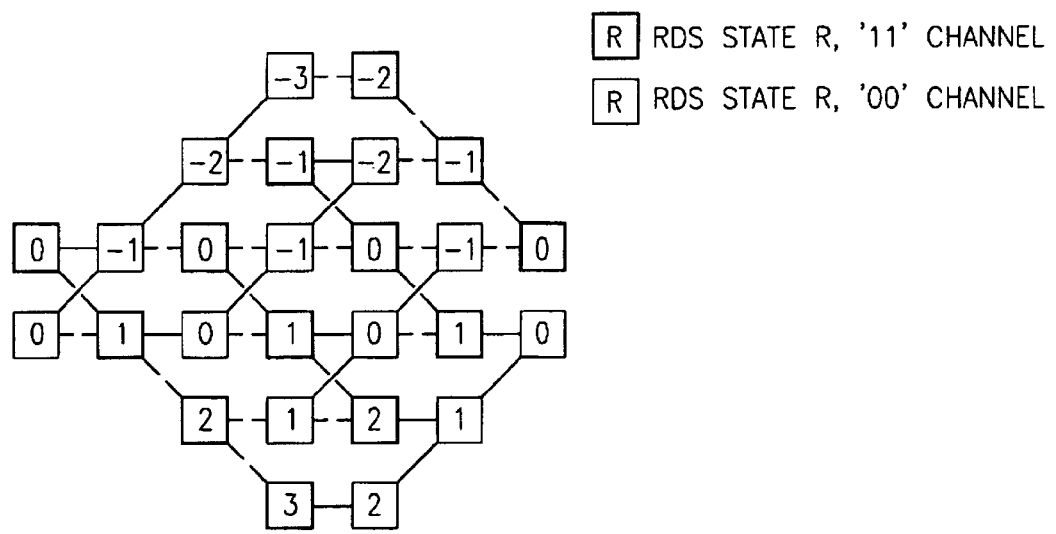
FIG. 10 shows a full channel and code trellis requiring four states for a data and sync detector according to the present invention.

FIG. 10 shows a full channel and code trellis requiring just four states. This trellis structure is almost totally matched to the detector trellis, as just two invalid sequences are still supported. So, in FIG. 10 half rate trellis connections are reported. The squared boxes indicated with IN and IN1 are starting states. The box IN1 is the previous code word. Those boxes having bold borderlines represent a RDS state R for the "11" channel. Those boxes indicated with F1 and F2 are forbidden transitions or states. The remaining boxes represent a RDS state R for the "00" channel.

FIGS. 11 and 12 report in a table format a pseudo-verilog code to describe the encoding and decoding processes, respectively.

The following table reports the encoder scheme shown in FIG. 11. Each gray nibble of four input bit is switched into a six bit code according to the following assignments:

| | |
|---|---|
| 0000 | 001011 |
| 0001 | 001110 |
| 0011 | 011010 |
| 0010 | 010011 |
| 0110 | 010110 |
| 0111 | 011100 |
| 0101 | 001101 |
| 0100 | 011001 |
| 1100 | 110001 |
| 1101 | 010101 |
| 1111 | 110100 |
| 1110 | 100101 |
| 1010 | 101100 |
| 1011 | 100110 |

-continued

| | |
|---|---|
| 1001 | 100011 |
| 1000 | 101001 |

Figure 13:
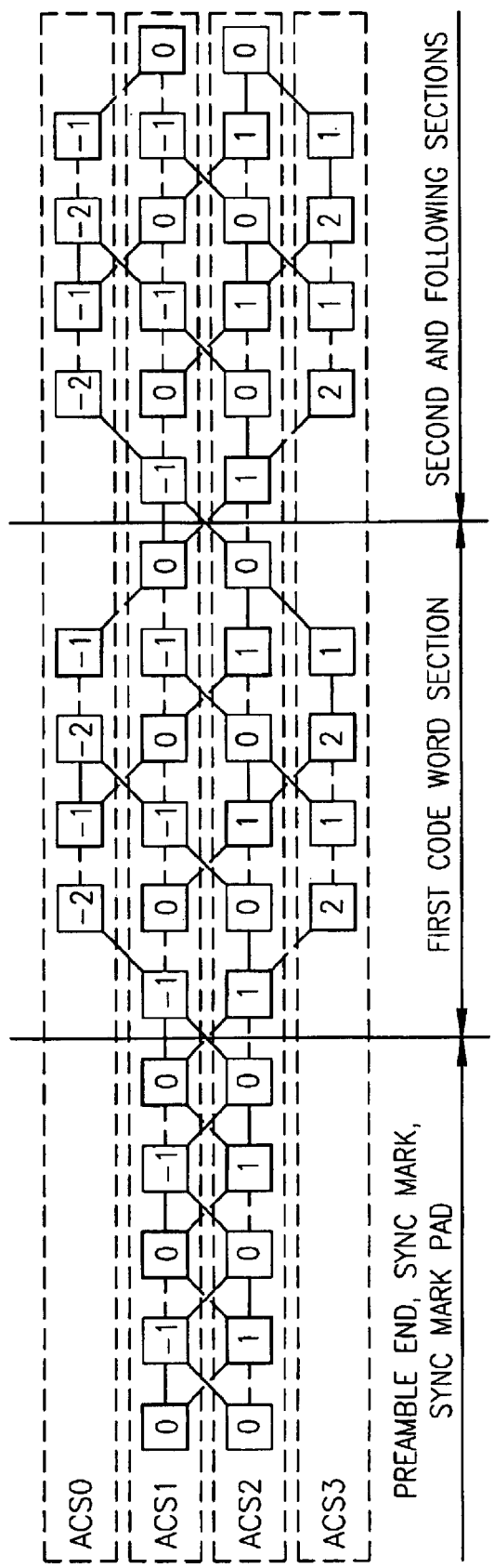
FIG. 13 is a schematic view of an Add, Compare and Select unit implemented in a servo sector onset for the half rate trellis structure of FIG. 10.

Making now reference to FIG. 13, an ACS (Add Compare Select) unit assignment is shown through a servo sector onset for the half rate trellis of FIG. 10.

The initial preamble polarity detection phase is not shown.

During this preamble polarity detection phase the trellis structure is left idle waiting for a preamble polarity valid sequence. The initial trellis connection scheme should also be used when supporting the optional rate ¼ servo scheme provided in the channel chip Bramante of the prior art.

It is interesting to notice that the gray MSN trellis can be flushed using also the burst section, provided that the gap between the gray and the burst fields is an even multiple of the channel symbol.

This constraint should be ensured while writing the servo information.

The Viterbi detector 1 requires a minimum of four Add, Compare and Select units (ACS) which are selectively assigned to different states according to the ACS rotation scheme described in FIG. 13.

The servo sync pattern to be used with this inventive detector is a 16 bit pattern 33CCH, which is compatible with a standard ¼ trellis constraints.

Figure 14:
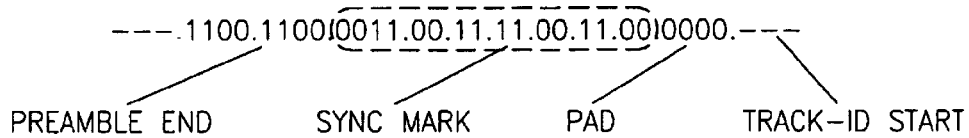
FIG. 14 shows a servo sync binary pattern used in a detector according to the invention.

FIG. 14 shows a servo sync binary pattern used in the detector according to the invention. The pattern alignment with respect to preamble and data it's shown too.

The detector 1 according to the invention supports also the known ¼ biphase encoding scheme.

With this simple encoding scheme, the input symbols {0, 1} are associated to four symbol sequences as:

input==0->write 1100 input==1->write 0011 and refer to this map as to the biphase mapping.

Upon adequate trellis synchronization, it is possible to decode optimally this code over the PR4 channel with a Viterbi detector 1 processing four channel symbols at each time and working at one fourth of the channel rate.

Figure 15:
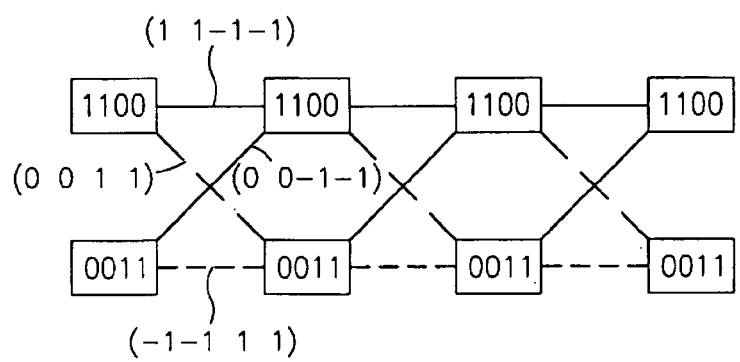
FIG. 15 shows a schematic structure of a rate 1/4 biphase trellis that is available for a detector of the present invention.

FIG. 15 shows a schematic structure of a rate ¼ biphase trellis.

The ¼ biphase trellis supports both the preamble and the sync mark constraints.

A ¹⁄₂₀ parity check is also supported by the inventive Viterbi detector 1. This parity check trellis is based on the biphase channel symbols. A parity symbol is inserted after four biphase symbols to enhance the error detection capability.

Figure 16:
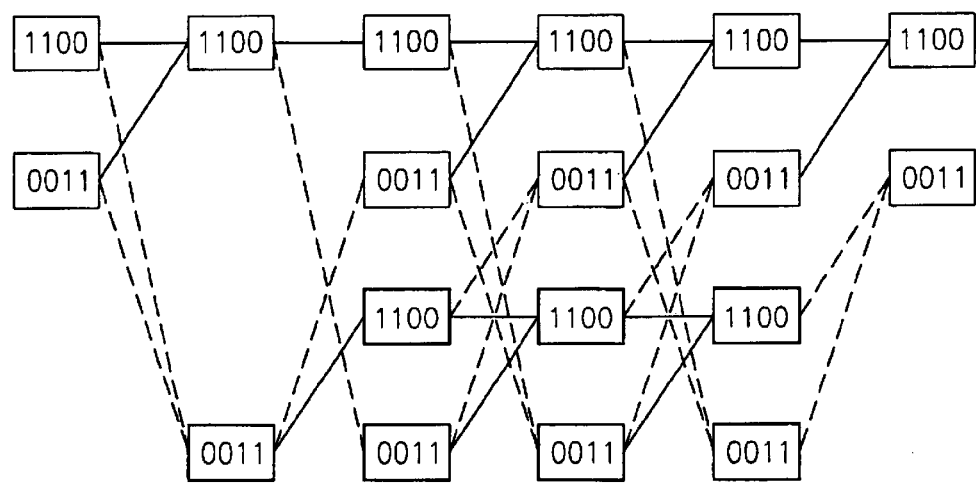
FIG. 16 shows a schematic view of an overall trellis structure that is totally matched to both code and PR4 line states for a detector of the present invention.

The overall trellis is depicted in FIG. 16 and is totally matched to both code and PR4 line states. States are labeled as in the biphase code, and trellis transition metrics between states 'biphase' are the same used in the biphase code. Each biphase state is doubled to take into account the overall sequence parity.

The encoding process can be described in two steps:

form the incoming four-bit sequence $x_0 \ldots {}_3 = \{x_0\ x_1\ x_2\ x_3\}$ form $xp_0 \ldots {}_3 = \{x_0\ x_1\ x_2\ x_3\ xp_4\}$ with $xp_4$ defined as:

$$xp4 = \left[\sum_{i=0}^{3} xi\right] \bmod 2$$

Biphase encode the $xp_0 \ldots {}_3$ sequence using the biphase map for each symbol $xp_i$.

In other words, the five bit sequence obtained with the first encoding step is treated in a biphase trellis structure to obtain a ¹⁄₂₀ encoding scheme.

Thanks to the use of a pure CMOS technology, the gray code Viterbi detector 1 reduces power consumption, that is particularly important for laptop applications.

The process and detector according to the invention achieve a significant result providing a total hardware and firmware system solution for the hard disk drive market, thus enabling a higher level of system-on-chip integration.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An encoding and decoding process for a servo positioning system of a reading and writing head of a hard disk drive, comprising the following steps:

receiving a pattern signal that includes a plurality of groups of four bits;

encoding each group of four bits of the pattern signal in a Matched Spectral Null (MSN) format through an intermediate rate ⁴⁄₆ code, thereby produced a six bit code word;

providing a duplicated bit for each bit of the six bit code word obtained with the previous step, thereby producing an encoded word that is written to a hard disk of the hard disk drive;

reading a servo wedge information signal, that includes the encoded word, from the hard disk using a read and write channel of the hard disk drive; and using a trellis Partial Response decoding scheme matched to said encoded word for obtaining angular and radial information for positioning the head.

2. The process according to claim 1 wherein the encoding phase is a concatenation of a ⁴⁄₆ MSN encoding phase and a ½ repetition code.

3. The process according to claim 1 wherein a 'gray-like' code feature is achieved by imposing a property of a minimum Euclidean distance between code words corresponding to two consecutive gray codes.

4. The process according to claim 1 wherein the encoding step prevents MSN sequences such as '000111' and '111000' in order to minimize the number of trellis states.

5. The process according to claim 1 wherein a sixteen states Viterbi detector is used for the decoding step.

6. The process according to claim 5 wherein a basic encoding constraint for a minimum transition spacing is set to $2T_{channel}$, where $T_{channel}$ is a channel synchronization time unit.

7. The process according to claim 5 wherein said Viterbi detector supports twenty sequences with zero Running Digital Sum (RDS) for a six-bits sequence $cw=\{x_0, x_1, x_2, \ldots, x_5\}$ according to the following relationship:

$$RDS[cw] = \sum_{i=0}^{5} (-1)^{x[i]},$$

such a six-bits sequence being in the 4/6 MSN code if RDS[cw]=0, thus enabling the design of the rate 4/6 code.

8. The process according to claim 5 wherein in said encoding step, each group of four bits of the pattern signal is switched into a six bit code according to the following assignments:

| | |
|---|---|
| 0000 | 001011 |
| 0001 | 001110 |
| 0011 | 011010 |
| 0010 | 010011 |
| 0110 | 010110 |
| 0111 | 011100 |
| 0101 | 001101 |
| 0100 | 011001 |
| 1100 | 110001 |
| 1101 | 010101 |
| 1111 | 110100 |
| 1110 | 100101 |
| 1010 | 101100 |
| 1011 | 100110 |
| 1001 | 100011 |
| 1000 | 101001. |

9. The process according to claim 1 wherein the encoding step prevents MSN sequences such as '000111' and '111000' in order to minimize the number of trellis states.

10. An encoding and decoding process for a servo positioning system of a reading and writing head of a hard disk drive, comprising the following steps:
receiving a pattern signal that includes a plurality of groups of four bits;
encoding each group of four bits of the pattern signal to a five bit code including a fifth final parity bit;
providing a biphase encoding of the five bit code to produce an encoded word that is written to a hard disk of the hard disk drive;
reading from the hard disk a servo wedge information signal, that includes the encoded word, using a read and write channel of the hard disk drive; and
using a trellis Partial Response decoding scheme matched to said encoded word for obtaining angular and radial information for positioning the head.

11. The encoding and decoding process according to claim 10, wherein each four-bit group $\{x_0\ x_1\ x_2\ x_3\}$ is encoded in a five-bit code $\{x_0\ x_1\ x_2\ x_3\ xp_4\}$ with $xp_4$ defined as:

$$xp_4 = \left[\sum_{i=0}^{3} xi\right] \bmod 2 \text{ with } Xi = 0 \text{ or } 1.$$

12. The encoding and decoding process according to claim 11, wherein said biphase encoding step is performed using a biphase map for each symbol $xp_i$.

13. The encoding and decoding process for a servo positioning system of a reading and writing head of a hard disk drive, comprising the following steps:
encoding a predetermined group of input bits of a pattern signal in a Matched Spectral Null (MSN) format through an intermediate rate 4/6 code to produce a six bit code word;
providing a duplicated bit for each bit of the six bit code word, thereby producing an encoded word that is written to a hard disk of the hard disk drive;
reading from the hard disk a servo wedge information signal, that includes the encoded word, using a read and write channel of the hard disk drive; and
using a trellis Partial Response decoding scheme matched to said encoded word for obtaining angular and radial information for positioning the head.

14. The process according to claim 13 wherein the encoding phase is a concatenation of a 4/6 MSN encoding phase and a 1/2 repetition code.

15. The process according to claim 13 wherein a 'gray-like' code feature is achieved by imposing a property of a minimum Euclidean distance between code words corresponding to two consecutive gray codes.

16. The process according to claim 13 wherein a sixteen states Viterbi detector is used for the decoding step.

17. The process according to claim 16 wherein a basic encoding constraint for a minimum transition spacing is set to $2T_{channel}$, where $T_{channel}$ is a channel synchronization time unit.

18. The process according to claim 16 wherein said Viterbi detector supports twenty sequences with zero Running Digital Sum (RDS) for six-bits sequence cw=$\{x_0, x_1, x_2, \ldots, x_5\}$ according to the following relationship:

$$RDS[cw] = \sum_{i=0}^{5} (-1)^{x[i]},$$

such a six-bits sequence being in the 4/6 MSN code if RDS[cw]=0, thus enabling the design of the rate 4/6 code.

19. The process according to claim 13 wherein in said encoding step, each group of four bits of the pattern signal is switched into a six bit code according to the following assignments:

| | |
|---|---|
| 0000 | 001011 |
| 0001 | 001110 |
| 0011 | 011010 |
| 0010 | 010011 |
| 0110 | 010110 |
| 0111 | 011100 |
| 0101 | 001101 |
| 0100 | 011001 |
| 1100 | 110001 |
| 1101 | 010101 |
| 1111 | 110100 |
| 1110 | 100101 |
| 1010 | 101100 |
| 1011 | 100110 |
| 1001 | 100011 |
| 1000 | 101001. |

20. An encoding and decoding process for a servo positioning system of a reading and writing head of a hard disk drive, comprising the following steps:
receiving a pattern signal that includes a plurality of groups of four bits;
encoding each group of four bits of the pattern signal by adding a parity check bit as an intermediate rate 4/5 code;
encoding each of the five bits using a biphase map to produce an encoded word that is written to a hard disk of the hard disk drive;

reading from the hard disk a servo wedge information signal, that includes the encoded word, using a read and write channel of the hard disk drive; and using a trellis Partial Response decoding scheme matched to said encoded word for obtaining angular and radial information for positioning the head.

21. The encoding and decoding process according to claim 20, wherein each four-bit group $\{x_0\ x_1\ x_2\ x_3\}$ is encoded in a five-bit code $\{x_0\ x_1\ x_2\ x_3\ xp_4\}$ with $xp_4$ defined as:

$$xp_4 = \left[\sum_{i=0}^{3} xi\right] \bmod 2 \text{ with } Xi = 0 \text{ or } 1.$$

22. The encoding and decoding process according to claim 21, wherein said biphase encoding step is performed using a biphase map for each symbol $xp_i$.

23. A Viterbi data detector for encoding and decoding phases in a servo positioning system of a reading and writing head of a hard disk drive, said detector being associated with a reading and writing channel for picking-up servo wedges information from a hard disk of the hard disk drive, the data detector comprising:

means for receiving from said servo wedges information encoded through an intermediate 4/6 Matched Spectral Null (MSN) encoding phase followed by a duplication of each bit of six bit code word obtained with the encoding phase; and a decoder including a trellis structure for obtaining from the servo wedges a partial response indicative of angular and radial information for positioning the head.

24. The data detector according to claim 23, wherein said trellis structure includes at least four Add, Compare and Select units (ACS) which are selectively assigned to different states according to a predetermined ACS rotation scheme.

25. The data detector according to claim 23, wherein a servo sync 16-bit binary pattern is used as servo wedge.

26. A Viterbi data detector for the encoding and decoding phases in a servo positioning system of a reading and writing head of a hard disk drive, said detector being associated with a reading and writing channel for picking-up servo wedges information from a hard disk of the hard disk drive, the data detector comprising:

means for receiving from said servo wedges information encoded through an intermediate 4/5 Parity Check encoding phase followed by a biphase encoding step of each bit of a five bit code word obtained with the previous phase; and a decoder including a trellis structure for obtaining a partial response indicative of angular and radial information for positioning the head.

27. The data detector of claim 26, further comprising an encoder that encodes an input four-bit group $\{x_0\ x_1\ x_2\ x_3\}$ to a five-bit code $\{x_0\ x_1\ x_2\ x_3\ xp_4\}$ with $xp_4$ defined as:

$$xp_4 = \left[\sum_{i=0}^{3} xi\right] \bmod 2 \text{ with } Xi = 0 \text{ or } 1.$$

28. The data detector of claim 27, wherein said encoder includes means for using a biphase map for each symbol $xp_i$.

* * * * *